United States Patent
Choate et al.

(10) Patent No.: US 6,516,828 B2
(45) Date of Patent: Feb. 11, 2003

(54) SNAP-TYPE SAFETY RELIEF VALVE HAVING A CONSISTENT LOW BLOW-DOWN VALUE

(75) Inventors: Jeremy R. Choate, Stafford, TX (US); Michael J. Easton, Edmond, OK (US)

(73) Assignee: Mercer Valve Company, Inc., Oklahoma City, OK (US)

( * ) Notice: Subject to any disclaimer, the term of this patent is extended or adjusted under 35 U.S.C. 154(b) by 0 days.

(21) Appl. No.: 09/885,293

(22) Filed: Jun. 19, 2001

(65) Prior Publication Data

US 2002/0189680 A1 Dec. 19, 2002

(51) Int. Cl.[7] .............................................. F16K 17/30
(52) U.S. Cl. ...................................... 137/469; 251/118
(58) Field of Search ................................. 137/469, 474, 137/475, 476, 477, 478; 251/118, 127

(56) References Cited

U.S. PATENT DOCUMENTS

| | | | | |
|---|---|---|---|---|
| 1,560,829 A | * | 11/1925 | Kraut ........................... | 251/127 |
| 2,568,026 A | | 9/1951 | Pigott ........................... | 137/53 |
| 2,686,534 A | | 8/1954 | Montelius ................... | 137/514 |
| 2,704,549 A | | 3/1955 | Strnad ......................... | 137/469 |
| 3,084,710 A | | 4/1963 | Gondek ....................... | 137/514 |
| 3,145,732 A | | 8/1964 | Joles ........................ | 137/514.3 |
| 3,406,712 A | | 10/1968 | Weise .......................... | 137/470 |
| 3,411,530 A | | 11/1968 | Powell ........................ | 137/145 |
| 3,664,362 A | | 5/1972 | Weise .......................... | 137/102 |
| 4,446,886 A | | 5/1984 | Taylor et al. ................ | 137/516 |
| 4,530,373 A | | 7/1985 | Bork, Jr. et al. ............ | 137/540 |
| 4,566,486 A | | 1/1986 | Taylor et al. ................ | 137/469 |
| 4,588,163 A | | 5/1986 | Christensen ................. | 251/285 |
| 4,678,004 A | | 7/1987 | Rosenberg ................... | 137/469 |
| 4,799,506 A | | 1/1989 | Taylor ......................... | 137/469 |
| 4,932,434 A | | 6/1990 | Taylor ......................... | 137/469 |
| 5,370,151 A | * | 12/1994 | Smart .......................... | 137/469 |
| 5,820,102 A | | 10/1998 | Borland ....................... | 251/144 |
| 6,095,183 A | | 8/2000 | Taylor et al. ................ | 137/475 |

* cited by examiner

*Primary Examiner*—John Rivell
(74) *Attorney, Agent, or Firm*—Steven P. Shurtz; Brinks Hofer Gilson & Lione

(57) ABSTRACT

A snap-type safety relief valve is provided that is designed for use under specified operating conditions on a pressure vessel or a flow line having a pressurized gas therein. The safety relief valve comprises: (a) a body attachable to the pressure vessel or flow line, the body comprising a chamber therein and an inlet and an outlet, the inlet comprising an inlet valve seat, the outlet being adapted to attach to outlet piping; (b) a disk member closable on the inlet valve seat; (c) a mechanism in the body biasing the disk member to rest on the inlet valve seat with a set force such that when the pressure in the pressure vessel exceeds a set pressure resulting from the set force, the disk member is lifted from the inlet valve seat; and (d) a secondary orifice between the chamber and the outlet, the secondary orifice being sized so that gas flows from the inlet valve seat into the chamber in a sonic flow and so that gas flows from the chamber through the secondary orifice in a sonic flow when the valve opens due to a pressure in the pressure vessel or flow line exceeding the set pressure during testing under the specified operating conditions. A method of designing a low blow-down snap-type safety relief valve is provided, as is a method of relieving pressure from a pressurized system using a snap-type safety relief valve.

26 Claims, 5 Drawing Sheets

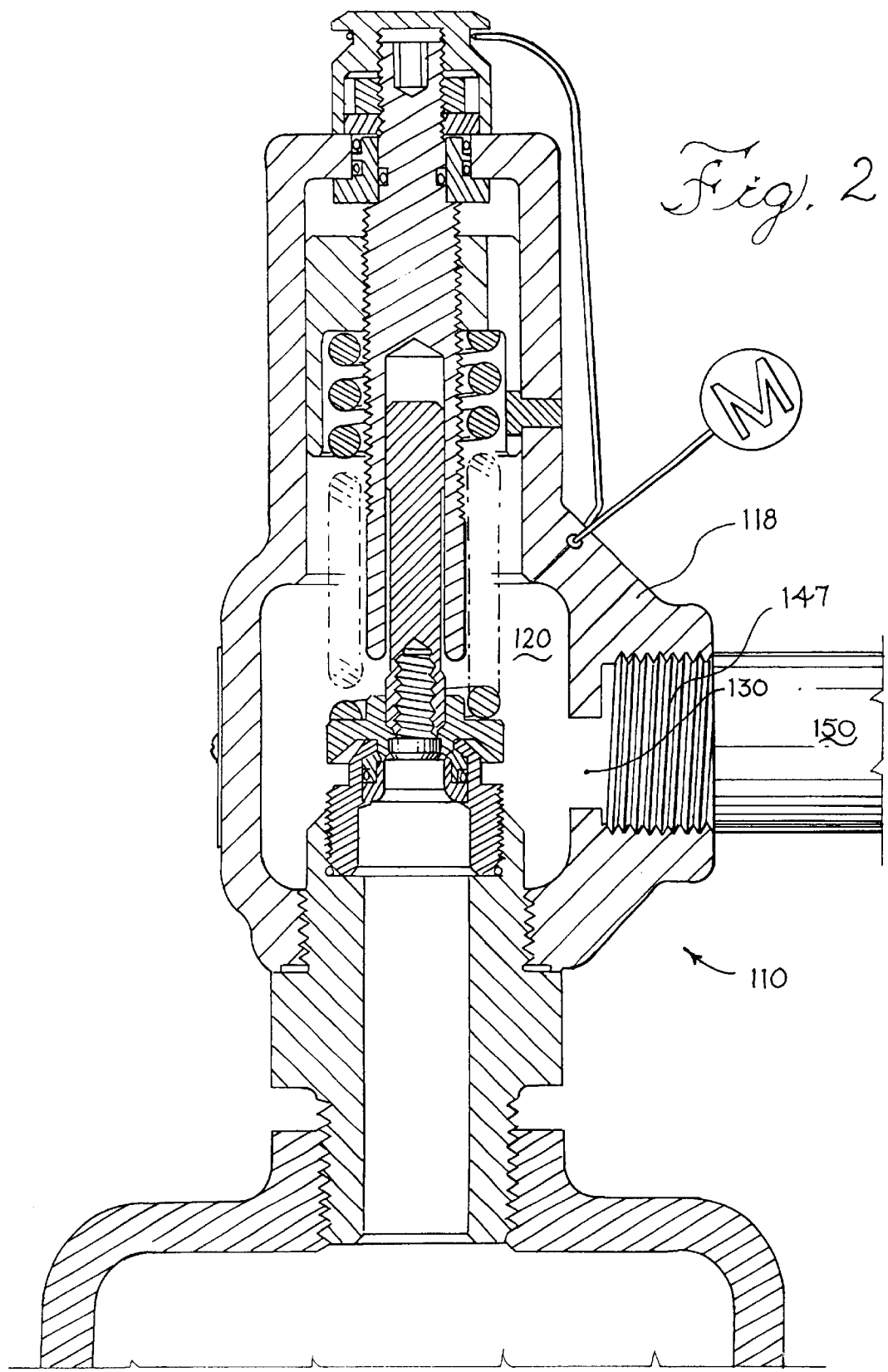

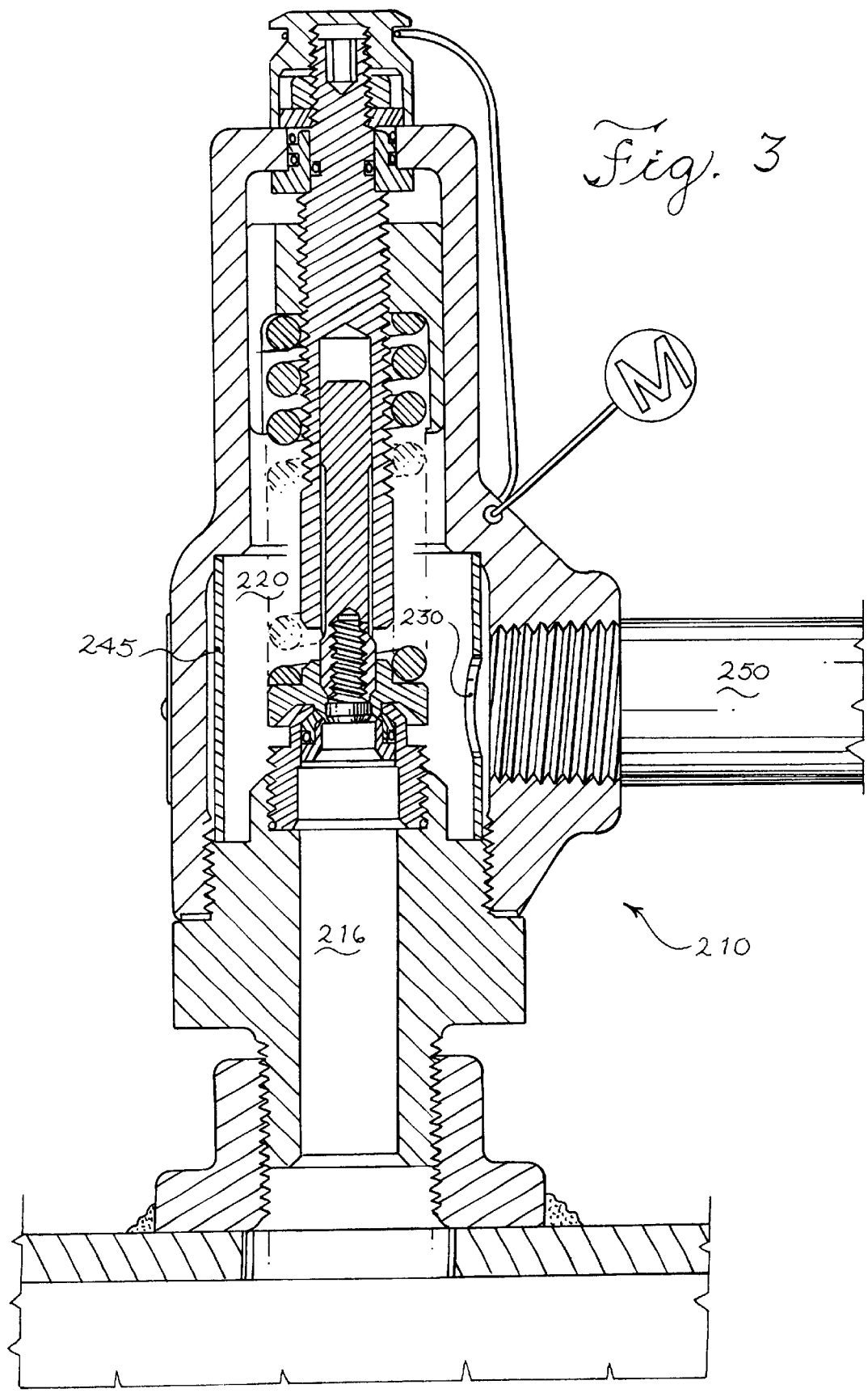

SNAP-TYPE SAFETY RELIEF VALVE HAVING A CONSISTENT LOW BLOW-DOWN VALUE

BACKGROUND

The present invention relates to snap-type safety relief valves for use on a pressurized system such as pressure vessel or a flow line, especially snap-type safety relief valves having a consistent low blow-down value.

Snap-type safety relief valves have the advantage of responding very quickly to pressure changes in pressurized systems to which they are attached. Snap-type safety relief valves move to a fully open position almost immediately after the pressure within the pressure vessel rises above a user-determined set pressure. This allows excess gas pressure to escape quickly. Then, when sufficient pressure has escaped, snap-type safety relief valves quickly and crisply move back to a closed position. For an example of a snap-type safety relief valve, see U.S. Pat. No. 3,664,362, which is herein incorporated by reference in its entirety.

A "blow-down value" is the percentage difference between the user-determined set pressure and the pressure in the pressure vessel or flow line when the snap-type safety relief valve snaps closed. For example, if a user sets the set pressure at 100 psi, and valve stays open as gas escapes out of the snap-type safety relief valve until the pressure in the pressure vessel or flow line is 70 psi, then this snap-type safety relief valve has a blow-down value of 30%. For an example of a snap-type safety relief valve having a standard blow-down value, see U.S. Pat. No. 4,799,506, which is herein incorporated by reference in its entirety. Low blow-down valves have a blow-down value of about 15% or less, preferably about 10% or less. Low blow-down valves are desirable because they can minimize the amount of gas that is lost from the pressurized system into the atmosphere during venting, thereby addressing environmental concerns.

Existing low blown-down snap-type safety relief valves do, however, have some problems. One problem is that the blow-down value of the valves are affected by built-up downstream back pressures. The term "built-up downstream back pressures" is well understood in the art and documented in the American Petroleum Institute Recommended Practice 520. The length of outlet piping and the number of elbows that are attached to the outlet of the snap-type safety relief valves contributes to built-up downstream back pressures. Generally, the longer the outlet piping and the greater the number of elbows in the outlet piping, the more built-up downstream back pressures are created.

Built-up downstream back pressures affect the blow-down value of typical snap-type safety relief valves. For example, a manufacturer may sell a snap-type safety relief valve with a blow-down value of 10% that is recommended to be used with 10 feet of outlet piping. At an installation site, the installer may disregard the manufacturer's recommendations and use 20 feet of outlet piping. In such a case, when the valve is in use, it will experience greater built-up downstream back pressures than the manufacturer designed for. The additional built-up downstream back pressures counteract forces that keep the valve open, and may cause the snap-type safety relief valve to close prematurely. If this occurs while the pressurized system still needs to vent, the snap-type safety relief valve would open again. The valve may then open and close in rapid succession, which is a phenomenon known as chatter. Chatter can shorten the life of a snap-type safety relief valve.

Another problem with existing low blow-down snap-type safety relief valves is that they tend to have a sliding-fit piston/sleeve design. See, for example, the snap-type safety relief valve described in U.S. Pat. No. 3,411,530, which is herein incorporated by reference in its entirety. In these designs, when the piston is raised so that gas may escape, a portion of the sleeve may obstruct the flow path as fluid flows through holes in the sleeve. As fluid escapes, foreign particles tend to accumulate between the sliding surfaces, causing additional friction between the sliding-fit parts. This build-up of foreign particles can cause freeze-up of the piston. This can affect the amount of pressure necessary to open the valve, and it can affect the blow-down value of the valve, making the valve's performance less predictable. Also, contaminated gas can cause the valve to malfunction.

In addition to the above-mentioned problems, low blow-down snap-type safety relief valves can vary in quality in a number of ways. All snap-type safety relief valves each have a flow coefficient, which represents how unobstructed gas flows through the valve when it is fully open. The higher the flow coefficient, the better. Also, different snap-type safety relief valves vary in their ability to maintain their blow-down value, their performance reliability, their durability, their cost to manufacture, and their ease of use.

SUMMARY OF THE INVENTION

A snap-type safety relief valve has been discovered that addresses the problems left unsolved by prior valves. Namely, it has been discovered that a snap-type safety relief valve having sonic flow into the body of the valve and out of a secondary orifice on the valve prevents built-up downstream back pressures from affecting the low blow-down value of the valve. This means that the addition of longer outlet piping on the valve, within limits, will not change the low blow-down value of the valve. Thus, the low blow-down value of the valve is consistent. If an excessive length of piping is added, however, then the flow out of the secondary orifice will no longer be sonic, and the blow-down value will be subject to built-up downstream back pressures. Nevertheless, so long as the flow into the body of the valve and out of the secondary orifice of the valve is sonic, built-up downstream back pressures are prevented from counteracting the forces keeping the valve open. The snap-type safety relief valve of the present invention preferably has a high flow co-efficient, and is easy and inexpensive to use and manufacture.

In one aspect of the invention, a snap-type safety relief valve designed for use under specified operating conditions on a pressure vessel or a flow line having a pressurized gas therein is provided. The safety relief valve includes a body attachable to the pressure vessel or flow line, the body comprising a chamber therein and an inlet and an outlet, the inlet comprising an inlet valve seat, the outlet being adapted to attach to outlet piping. The safety relief valve also includes a disk member closable on the inlet valve seat. Further, the safety relief valve includes a mechanism in the body biasing the disk member to rest on the inlet valve seat with a set force such that when the pressure in the pressure vessel exceeds a set pressure resulting from the set force, the disk member is lifted from the inlet valve seat. The safety relief valve also includes a secondary orifice between the body chamber and the outlet, the secondary orifice being sized so that gas flows from the inlet valve seat into the chamber in a sonic flow and so that gas flows from the chamber through the secondary orifice in a sonic flow when the valve opens due to a pressure in the pressure vessel or flow line exceeding the set pressure during testing under the specified operating conditions.

In another aspect of the invention, a combination of outlet piping and a snap-type safety relief valve is provided. The combination includes a safety relief valve body attachable to the pressure vessel or flow line, the body comprising a valve body chamber therein and an inlet and an outlet, the inlet comprising an inlet chamber upstream of an inlet valve seat, the outlet being attached to the outlet piping, a portion of the outlet piping creating an outlet chamber proximal to the outlet. The combination also includes a disk member closable on the inlet valve seat and an adjustment screw acting on a spring in the body biasing the disk member to rest on the inlet valve seat with a set force such that when the pressure in the pressure vessel exceeds the set pressure resulting from the set force, the disk member is lifted from the inlet valve seat. The combination further includes a secondary orifice between the valve body chamber and the outlet, the secondary orifice being sized so that pressure in the valve body chamber is less than about 50% of the pressure in the inlet chamber and so that pressure in the outlet chamber is less than about 50% of the pressure in the valve body chamber, when the valve opens due to a pressure in the pressure vessel or flow line exceeding the set pressure during testing under the specified operating conditions.

In still another aspect of the invention, an improved low blow-down snap-type safety relief valve is provided. The valve has an inlet, a disk member closable on the inlet, a mechanism biasing the disk member on the inlet, a body, and an outlet. The valve prevents built-up downstream back pressures from changing a blow down value. The improvement on the valve comprises a secondary orifice in the body of the safety relief valve sized to permit gas to escape from the body through the secondary orifice in a sonic flow when the valve is opened during testing under operating conditions specified for the use of the valve.

In yet another aspect of the invention, a method of designing a low blow-down snap-type safety relief valve is provided. The method comprises (a) choosing a set of operating conditions under which the valve will ordinarily be run, including a set pressure; (b) providing a trial snap-type safety relief valve having: (i) a body attachable to the pressure vessel, the body comprising a chamber and an inlet and an outlet, the inlet comprising an inlet valve seat, the outlet being adapted to attach to the outlet piping; (ii) a disk member closable on the inlet valve seat; (iii) a mechanism in the body biasing the disk member to rest on the inlet valve seat with a set force such that when the pressure in the pressure vessel exceeds the set pressure resulting from the set force, the disk member is lifted from the inlet valve seat; and (iv) a secondary orifice between the chamber and the outlet, the secondary orifice having a first diameter; and (v) the snap-type safety relief valve having a first pressure gauge attached thereto, the snap-type safety relief valve being mounted on a pressure vessel, the pressure vessel having a second pressure gauge attached thereto; (c) causing the snap-type safety relief valve to snap open by increasing the pressure in the pressure vessel to exceed the set pressure; and (d) comparing a reading from the first pressure gauge to a reading from the second pressure gauge while the valve is open, (i) if the reading of the pressure of the first pressure gauge is from about 35% to about 50% of the pressure of the second pressure gauge, then the design process is complete; else (ii) if the reading of the pressure of the first pressure gauge is not from about 35% to about 50%, adjusting the diameter of the secondary orifice and repeating steps (c)–(d) until the reading of the first pressure gauge is from about 35% to about 50% of the reading of the second pressure gauge.

In still another aspect of the invention, a method of relieving pressure from a pressurized system is provided. In this method, a snap-type safety relief valve is connected in fluid communication with the pressurized system and the valve has (i) a body surrounding a chamber, (ii) an inlet with an inlet valve seat, (iii) a disk member closeable on the inlet valve seat, (iv) a mechanism biasing the disk member closed on the inlet valve seat, (v) an outlet attachable to outlet piping, and (vi) a secondary orifice between the chamber and the outlet. The method comprises exceeding a set pressure established for the valve, thereby lifting the disk member from the inlet valve seat. The method also comprises flowing gas from pressurized system through the inlet into the chamber in a sonic flow. The method also comprises flowing gas from the chamber through the secondary orifice into the outlet in a sonic flow.

The present invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF SEVERAL VIEWS OF THE DRAWINGS

FIG. 2 is cross-sectional view of a second preferred embodiment of a low blow-down snap-type safety relief valve in a closed position.

FIG. 3 cross-sectional view of a third preferred embodiment of an embodiment of a low blow-down snap-type in a closed position.

DETAILED DESCRIPTION OF THE DRAWINGS AND OF THE PREFERRED EMBODIMENTS OF THE INVENTION

"Pressure" as used herein generally refers to absolute pressure rather than gauge pressure, unless otherwise specified. Pressures measured relative to zero pressure (a vacuum) are absolute pressures. Absolute pressure is used in the perfect gas law. Pressures measured relative to atmospheric pressure are called gauge pressures. Absolute pressure (psia or pounds per square inch absolute) equals the measured gauge pressure (psig) plus atmospheric pressure.

Figure 1:
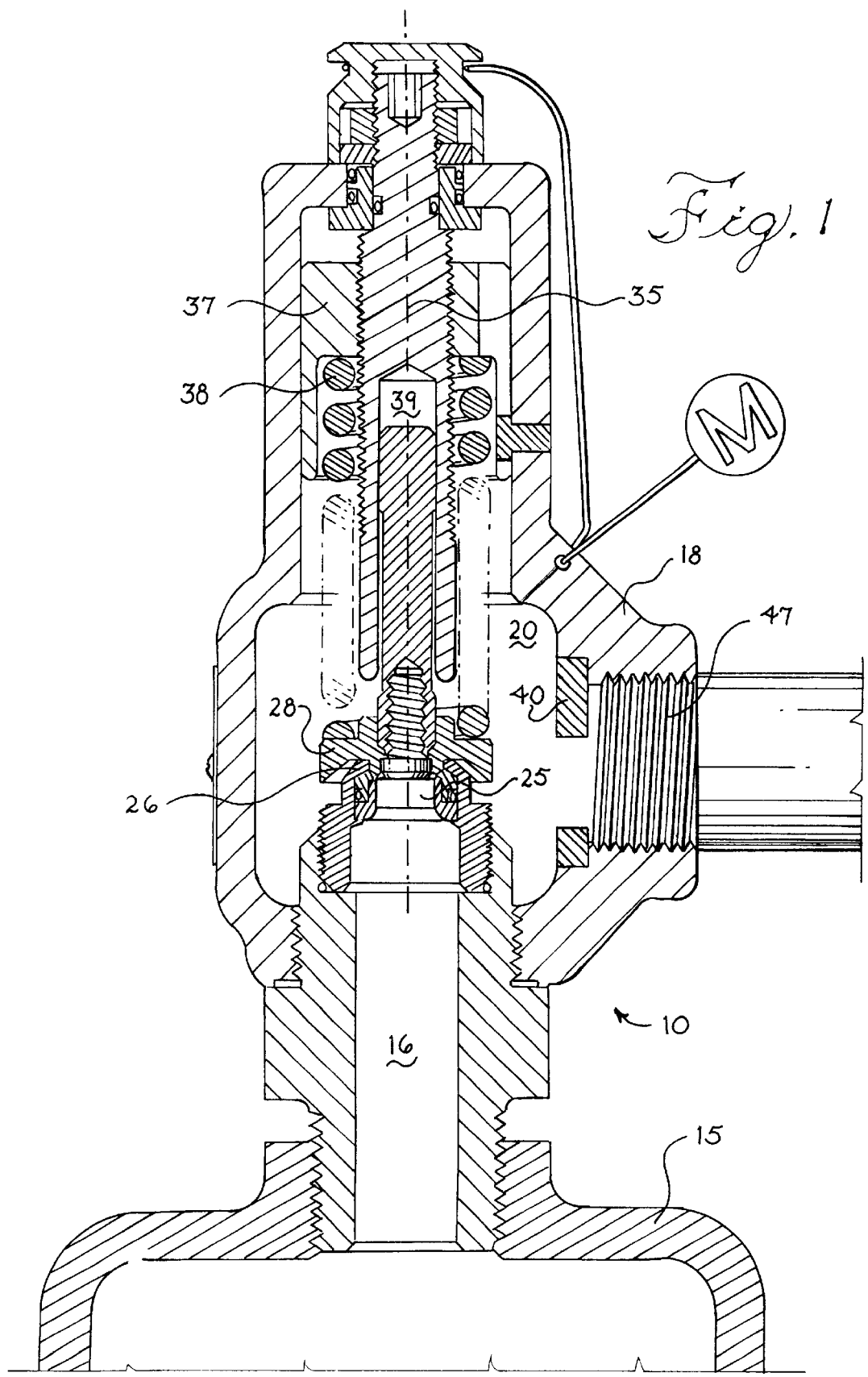
FIG. 1 is a cross-sectional view of a first preferred embodiment of a low blow-down snap-type safety relief valve in a closed position.

Referring to FIG. 1, a low blow-down snap-type safety relief valve 10 is shown in a closed position. The low blow-down snap-type safety relief valve 10 is removably affixed to a pressure vessel 15. Any method known in the art can be used to removably affix the snap-type safety relief valve 10 to the pressure vessel 15. Preferably, a threaded engagement is used. Nuts, bolts, screws, adhesives, and friction fitting may also be used.

The snap-type safety relief valve 10 has a body 18 defining a chamber 20 therein. Preferably, the body 18 is made of steel. Preferably, the steel that is used in the body 18 is one or more of commercially available mild steel, stainless steel, carbon steel, and combinations thereof. The material for a particular valve 10 may be selected based upon what the valve 10 will be used for, in particular, which gas will be flowing through valve 10.

In the closed position, disk member 28 removably rests upon the inlet valve seat 26 in the inlet nozzle 25. Preferably, the disk member 28 is made of steel. Preferably, the steel that is used in the disk member 28 is one or more of commercially available mild steel, stainless steel, carbon steel, and combinations thereof. Generally, the types of disk members 28 that are preferred require few sliding-fit parts, because sliding-fit parts and their assemblies are subject to high wear and tear. For example, the type of disk member 28 that is described in U.S. Pat. No. 4,799,506, which is herein incorporated by reference in its entirety, is a preferred disk member 28.

When the disk member 28 rests on inlet valve seat 26, gas cannot escape from the pressure vessel 15 through the inlet 16 and out of the inlet valve seat 26 into the chamber 20. The disk member 28 rests on inlet valve seat 26 in the closed position because a user has adjusted a mechanism to bias the disk member 28 to stay closed on inlet valve seat 26. Preferably, the mechanism is an adjustment screw 35, which acts, directly or indirectly, against a spring 38 to hold disk member 28 on inlet valve seat 26. For example, in FIG. 1, the adjustment screw 35 causes member 37 to directly act on spring 38.

The amount of force that the adjustment screw 35, member 37, and the spring 38 apply against the disk member 28 produces the set pressure. Although an adjustment screw 35 and a spring 38 are preferred, the set pressure can be adjusted using any mechanism known in the art.

Adjustment screw 35 is particularly preferred because it has a bore 39 therein. When the disk member 28 is removed from the inlet valve seat 26, the bore 39 provides a vertical path of movement for a stem on the disk member 28. Using this type of adjustment screw 35, the disk member 28 is guided up and down without any parts obstructing gas flow out of the snap-type safety relief valve 10, and without any undesirable lateral motion. This type of adjustment screw 35 is fully described in U.S. Pat. No. 4,799,506.

When the pressure inside the pressure vessel 15 exceeds the set pressure, snap-type safety relief valve 10 opens. Specifically, the gas comes through the inlet 16 through the inlet nozzle 25 and applies an upward force to the disk member 28. When the upward force exceeds the down forces acting on disk member 28, including the set pressure, the disk member 28 is lifted from the inlet valve seat 26 and guided upward. Note that the upward/downward language is used to describe the orientation of preferred embodiment of the valve 10 shown in FIG. 1. The snap-type safety relief valve 10 could be designed so that the disk member 28 moved horizontally rather than vertically, or in another direction.

When the disk member 28 is lifted from the inlet valve seat 26, gas escapes from the inlet nozzle 25 into the chamber 20. The gas escapes into the chamber 20 a sonic flow, which is the fastest that the gas can escape into valves made with a standard nozzle. The pressure in the chamber 20 is less than about 50% of the pressure in the inlet chamber 16. Even if the pressure in chamber 20 is much less than about 50% of the pressure in the pressure vessel or flow line (say, 30%), the pressure drop from the inlet chamber 16 to the throat of the inlet nozzle 25 will stay at about 50%.

The term "about 50%" is used because the critical pressure ratio for most gases used is fairly close to 50%. For example, the critical pressure ratios for air, nitrogen, and oxygen are all 52.8%, the critical pressure ratio for natural gas is 55.1%, and the critical pressure ratio for propane is 57.6%. Thus, one of skill in the art should understand that the term "about 50%" is meant to reflect the critical pressure ratio for the gas used in a particular installation of a snap-type safety relief valve 10.

Next, the gas must flow from the chamber 20 out of the secondary orifice 30, which lies in the orifice plate 40, out of the outlet and into the outlet piping 50. Flow out of the secondary orifice will be sonic when the valve is fully open under specified operating conditions, which will prevent built-up downstream back pressures from causing the valve to close prematurely. This means that the portion of the outlet piping 50 that is proximal to the secondary orifice 30, an outlet chamber 47, must have a pressure therein that is less than about 50% of the pressure in the chamber 20.

The orifice plate 40 is preferably made of steel. In steel embodiments, the orifice plate 40 is preferably stainless steel. The orifice plate 40 can be attached to the body 18 of the snap-type safety relief valve 10 using any mechanism known in the art, including friction fitting, nuts, bolts, screws, and the application of adhesive substances.

In FIG. 1, without the orifice plate 40, the gas would flow out of the outlet in a subsonic manner, making the snap-type safety relief valve 10 susceptible to built-up downstream back pressures caused by the length and shape of the outlet piping 50.

By adding the orifice plate 40 to the body 18, the area of the secondary orifice 30 through which the gas can flow has been reduced. The area of the secondary orifice 30 should be chosen to create conditions that will allow sonic flow out of the secondary orifice 30.

The desired area of secondary orifice 30 depends on the specified operating conditions for a particular installation of the snap-type safety relief valve 10. Such specified operating conditions include but are not limited to the media (the gas) being relieved through the valve 10, the temperature at which the valve 10 is run, the maximum pressure of the pressure vessel or flow line to which the valve 10 will be attached (which will be related to the set pressure), the size of the inlet and the outlet of the valve 10, the material comprising the trim of the inlet nozzle 25, the maximum flow capacity of the valve 10, the length and number of elbows of the outlet piping 50 attached to the valve 10, etc. Those of ordinary skill in the art understand the various specified operating conditions for a particular valve 10.

For example, a gas used in a typical installation might be air, natural gas, carbon dioxide, propane, or another gas. Temperature during operation of the valve 10 may be 100 degrees F. at the inlet nozzle 25 of the valve 10 and 70 degrees F. at the secondary orifice 30. A typical set pressure might be 100 psig, and the typical outlet piping 50 might be 2-inch schedule 80 piping that is 20 feet long and has one elbow.

For a particular installation, certain operating conditions may involve ranges. For example, a valve may be specified to operate at any temperature within a range of temperatures. Often, the manufacturer of a valve will specify ranges of operating conditions for which their valves are designed. For purposes of determining the specified operating conditions for the purposes of interpreting the attached claims, tests should be run at the midpoint of any such ranges.

Because the specified operating conditions vary for different installations, the desired area of secondary orifice 30 for a particular installation must be determined by one of skill in the art through routine experimentation given the specified operating conditions. An example is provided hereafter to assist one of skill in the art in determining the area of the secondary orifice 30 in the valve 10.

When the ideal area for secondary orifice 30 is determined and implemented in a valve 10, gas flows from the chamber 20 through the secondary orifice 30 in a sonic flow when the valve is open and running under specified operating conditions and there is at least 30 psia of pressure in the chamber 20. The sonic flow through the secondary orifice 30 prevents built-up downstream back pressures caused by the length and shape of the outlet piping 50 from affecting the blow-down value of the valve 10. Thus, the snap-type safety relief valve 10 may maintain its blow-down value better, chatter less, and last longer.

It is preferred that outlet piping 50 be less than 20 feet. It is also preferred that outlet piping 50 have 0, 1, or 2 elbows. Through routine experimentation, one of skill in the art can determine at what length and with how many elbows that the outlet piping 50 begins to affect the blow-down value of the snap-type safety relief valve 10 by preventing the flow out of the secondary orifice from being sonic.

The American Society of Mechanical Engineers Boiler and Pressure Vessel Code recommends that built-up downstream back pressures (such as those caused by outlet piping 50) for standard spring-operated valves does not exceed 10% of the set pressure at the outlet chamber 47.

Referring to FIG. 2, another preferred embodiment of a snap-type safety relief valve 110 is shown. Valve 110 is substantially identical to valve 10. The only difference is that valve 110 does not have an orifice plate 40. Instead, the body 118 of valve 110 is shaped to provide the function of creating the area of secondary orifice 130 through which gas flows in a sonic manner. The body 118 can be so shaped during its manufacture. The particular dimensions of the secondary orifice 130 depend upon the particular specified operating conditions of the installation, and must be determined by one of skill in the art through routine experimentation.

Importantly, the secondary orifice 130 should be sized so that the pressure in the outlet chamber 147 is less than about 50% of the pressure inside the chamber 120 when the valve 110 is opened due to a pressure exceeding the set pressure, and the valve 110 is running under specified operating conditions, and there is at least 30 psia of pressure in the chamber 120. This ensures sonic flow through the secondary orifice 130, preventing built-up downstream back pressures from effecting the blow-down value of the valve 110.

Referring to FIG. 3, another preferred embodiment of a snap-type safety relief valve 210 is shown. Valve 210 is substantially identical to valve 10, except that the valve 210 has a chamber 220 into which a hollow cylinder 245 has been inserted. The volume inside the hollow cylinder 245 serves as part of the wall of the chamber 220 in valve 210. That is, to achieve sonic flow from the inlet chamber 216 into the hollow cylinder 245, the pressure inside the hollow cylinder 245 must be less than about 50% of the pressure in the inlet chamber 216.

Also in FIG. 3, a sidewall of the hollow cylinder 245 has a secondary orifice 230 defined therein. Gas must escape through secondary orifice 230 before entering the outlet piping 250. The particular dimensions of the secondary orifice 230 depend on the specified operating conditions for a particular installation of the snap-type safety relief valve 210, and must be determined by one of skill in the art through routine experimentation.

Importantly, the secondary orifice 230 should be sized so that the pressure in the outlet chambers 247 is less than about 50% of the pressure inside the chamber 220 when the valve 210 is opened due to a pressure exceeding the set pressure, and the valve 210 is running under specified operating conditions, and there is at least 30 psia of pressure in the chamber 220. This ensures sonic flow through the secondary orifice 230, preventing built-up downstream back pressures from effecting the blow-down value of the valve 210.

Figure 5:
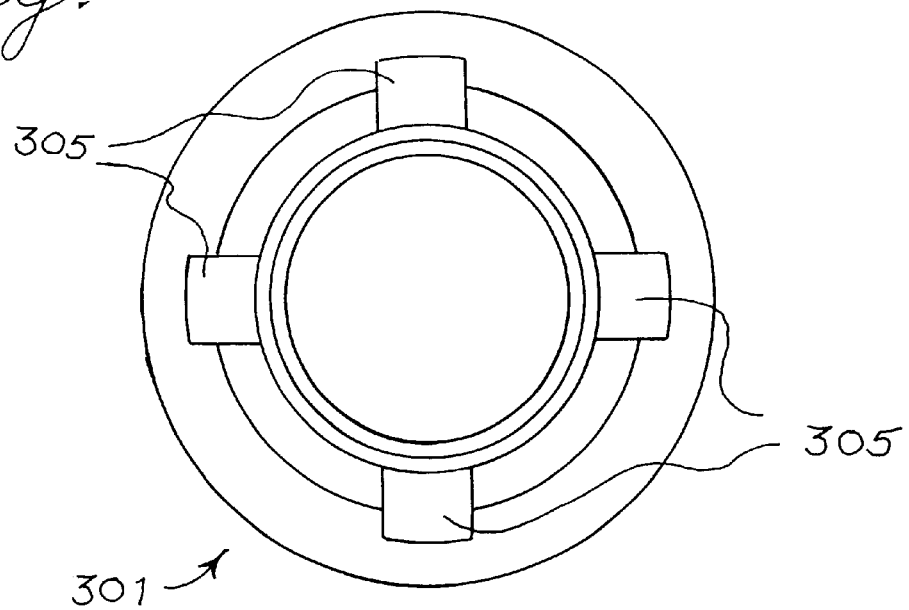
FIG. 5 is a top view of the nozzle of FIG. 4.
Figure 4:
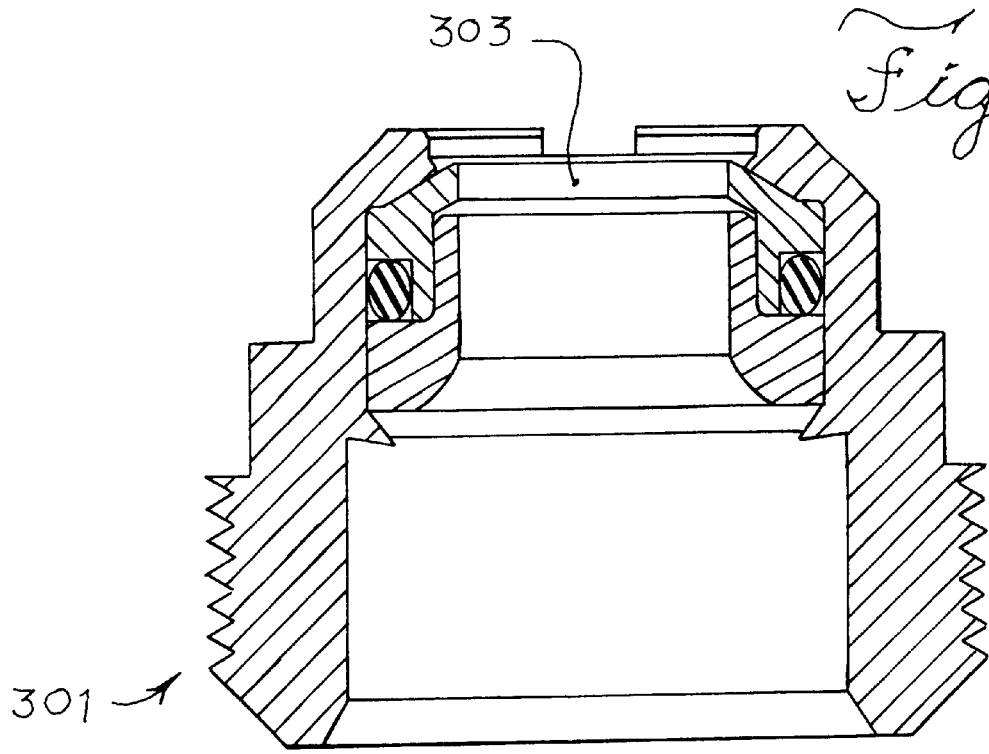
FIG. 4 is cross-sectional view of a nozzle that can be used with any of the low blow-down snap-type safety relief valves of FIGS. 1–3.

Referring to FIGS. 4 and 5, a preferred inlet nozzle 301 is shown. FIG. 4 shows a cross-sectional view of the inlet nozzle 301, and FIG. 5 is a top view of the same. The inlet nozzle 301 can be used with any low blow-down snap-type relief valve. The inlet nozzle has as huddling chamber 303. Huddling chambers are described in U.S. Pat. Nos. 4,446,886; 4,566,486; 4,799,506; and 4,932,434; which are herein incorporated by reference in their entirety.

Basically, a huddling chamber is a region in an inlet nozzle that causes a preferred snap-type safety relief valve to snap open. If a huddling chamber is too large, it can cause a blow-down value of a snap-type safety relief valve to be higher than desired. Thus, it may be desirable to modify a huddling chamber so that the valve still snaps open, but the valve keeps a low blow-down value.

Such modifications can be done by several methods that would be understood by one of skill in the art. For example, in FIG. 5, slots 305 were milled into the nozzle 301 to temper the effect of the huddling chamber 303. This way, some gas escapes through slots 305 rather than acting against the disk member.

PROPHETIC EXAMPLE 1

Determining the Size of a Secondary Orifice

Figure 6:
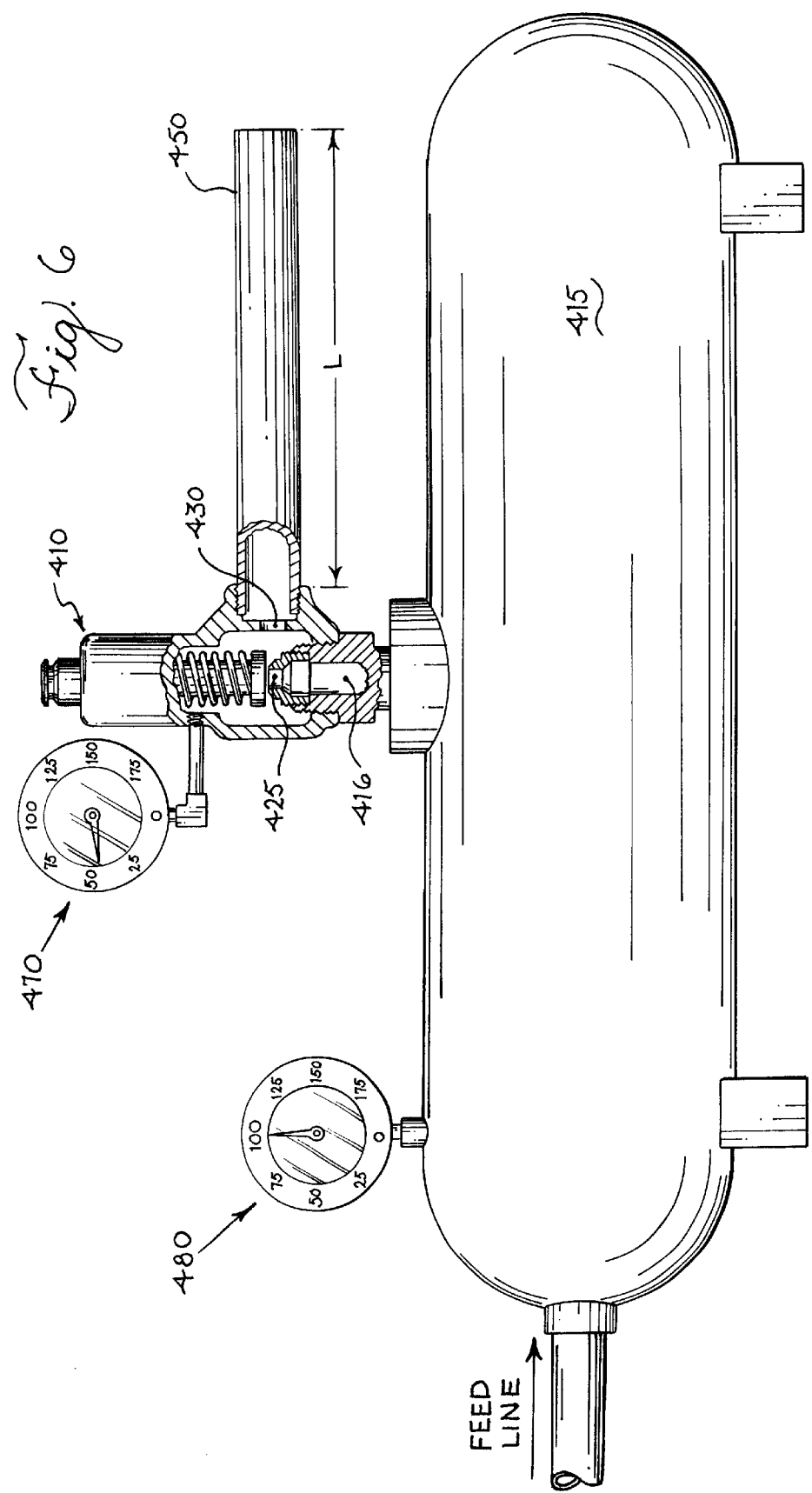
FIG. 6 is a schematic view of a preferred embodiment of a low blow-down snap-type safety relief valve mounted on a pressure vessel.

Referring to FIG. 6, a non-limiting example is provided to show a preferred method for experimentally determining what size to make a secondary orifice 430 in a trial snap-type low blow-down safety relief valve 410.

The trial snap-type low blow-down safety relief valve 410 is designed for specified operating conditions. For example, the trial snap-type low blow-down safety relief valve 410 may be designed to operate with a maximum length of from about 15 feet to about 20 feet of outlet piping 450 having one elbow (not shown). The outlet piping 450 is of the type with schedule number 80, since this is the most common seamless pipe for the pressure ranges addressed in this non-limiting example. The trial snap-type low blow-down safety relief valve 410 may also be designed for a set pressure of 100 psia that will relieve air from a pressurized system when the pressures therein exceed the set pressure. In a typical scenario, the air would flow into the valve 410 at 100 degrees F. and flow out of the valve 410 at 70 degrees F.

A trial snap-type low blow-down safety relief valve 410 having outlet piping 450 is mounted on a pressure vessel 415. The pressure in the pressure vessel 415 is reported by a vessel pressure gauge 480. The pressure in the trial snap-type low blow-down safety relief valve 410 is reported by a body pressure gauge 470. Both gauges are set to read pressure in psia.

The pressure in the pressure vessel 415 is increased until the trial snap-type low blow-down safety relief valve 410 snaps open. After the snap-type low blow-down safety relief valve 410 is fully open, the pressure reading on the vessel pressure gauge 480 should be compared to the pressure reading on the body pressure gauge 470.

As long as the pressure reading on the body pressure gauge 470 is less than about 50% of the pressure reading on the vessel pressure gauge 480, gas will flow sonically from the inlet nozzle 425 into the body of the trial snap-type low blow-down safety relief valve 410. Preferably, the pressure reading on the body pressure gauge 470 is from about 35% to about 50% of the pressure reading on the vessel pressure gauge 480. It is preferred that while the valve 410 is fully open, the pressure in the body should not drop below 30 psia.

This permits sonic flow of gas from the pressure vessel into the body of the trial snap-type low blow-down safety relief valve 410. This also permits sonic flow from the body of the trial snap-type low blow-down safety relief valve 410 out of the secondary orifice 430 so long as the back pressure due to the length and number of elbows in the outlet piping 450 are less than about 50% of the pressure reading on the body pressure gauge 470 and there is at least about 30 psia of pressure in the body of valve 410. Then, gas escapes through the outlet piping 450 and out to the atmosphere.

If the difference in the pressure readings falls within the 35 to 50% range, no adjustment need be made to the size of the secondary orifice 430 on the trial snap-type low blow-down safety relief valve 410.

If the reading of the body pressure gauge 470 exceeds 50% of the reading of the vessel pressure gauge 480, the size of the secondary orifice 430 should be enlarged, and the trial process repeated until the difference in the pressure readings falls within the preferred range. Otherwise, subsonic flow will occur at the inlet nozzle 425.

If the reading of the body pressure gauge 470 is less than 35% of the reading of the vessel pressure gauge 480, the size of the secondary orifice 430 should be reduced, and the process repeated until the pressure readings falls within the preferred range. Otherwise, the length of outlet piping 450 that the relief valve 410 can withstand without a change in blow-down value will be reduced.

When the critical pressure ratio of the gas being used in the system is read on the body pressure gauge, then the valve designer will know that the secondary orifice 430 is the smallest size possible without restricting the flow at the inlet nozzle 425.

Also, the outlet piping 450 can be changed with other, longer outlet piping and/or outlet piping having more elbows, so long as the additional length and/or elbows do not cause the pressure just outside the secondary orifice 430 to become greater than about 50% of the pressure reading on the body pressure gauge 470. However, if too much outlet piping 450 is added, the flow out of the secondary orifice 430 will not be sonic and the blow down value of the valve 410 will be affected.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is therefore indicated by the appended claims rather than by the foregoing description. All changes that come within the meaning and range of equivalency of the claims are embraced to be within their scope.

What is claimed is:

1. A snap-type safety relief valve designed for use under specified operating conditions on a pressure vessel or a flow line having a pressurized gas therein, the safety relief valve comprising:

(a) a body attachable to the pressure vessel or flow line, the body comprising a chamber therein and an inlet and an outlet, the inlet comprising an inlet valve seat, the outlet being adapted to attach to outlet piping;

(b) a disk member closable on the inlet valve seat;

(c) a mechanism in the body biasing the disk member to rest on the inlet valve seat with a set force such that when the pressure in the pressure vessel exceeds a set pressure resulting from the set force, the disk member is lifted from the inlet valve seat; and (d) a secondary orifice between the chamber and the outlet, the secondary orifice being sized so that gas flows from the inlet valve seat into the chamber in a sonic flow and so that gas flows from the chamber through the secondary orifice in a sonic flow when the valve opens due to a pressure in the pressure vessel or flow line exceeding the set pressure during testing under the specified operating conditions.

2. The safety relief valve of claim 1 wherein the mechanism biasing the disk member on the inlet valve seat comprises a spring being acted against by an adjustment screw.

3. The safety relief valve of claim 1 wherein the mechanism biasing the disk member on the inlet valve seat comprises a spring being acted against, indirectly, by an adjustment screw.

4. The safety relief valve of claim 3 wherein the adjustment screw has a bore therein that receives a stem on the disk member when the disk member is lifted from the inlet valve seat.

5. The safety relief valve of claim 1 having a blow-down value of less than about 15%.

6. The safety relief valve of claim 1 having a blow-down value of less than about 10%.

7. The safety relief valve of claim 1 in combination with outlet piping attached to the valve at the outlet.

8. The combination of claim 7 wherein the piping is less than about 20 feet long.

9. The combination of claim 7 wherein the piping is less than about 10 feet long.

10. The combination of claim 7 wherein the piping has less than 3 elbows.

11. The combination of claim 7 wherein the piping has one elbow.

12. The safety relief valve of claim 1 wherein the secondary orifice is formed in a plate that is inserted into the body of the safety relief valve.

13. The safety relief valve of claim 1 wherein the secondary orifice is formed integral with the body of the safety relief valve.

14. The safety relief valve of claim 1 wherein the chamber further comprises a hollow cylinder therein, the hollow cylinder encompassing the inlet and the hollow cylinder having a sidewall hole, the sidewall hole acting as the secondary orifice, whereby gas flows through the inlet into the hollow cylinder in a sonic flow, and gas escapes through the sidewall hole into the outlet in a sonic flow when the valve opens due to a pressure in the pressure vessel or flow line exceeding the set pressure during testing under the specified operating conditions.

15. A combination of outlet piping and a snap-type safety relief valve designed for use under specified operating conditions on a pressure vessel or flow line having a pressurized gas therein, the combination comprising:

(a) a safety relief valve body attachable to the pressure vessel or flow line, the body comprising a valve body chamber therein and an inlet and an outlet, the inlet comprising an inlet chamber upstream of an inlet valve seat, the outlet being attached to the outlet piping, a portion of the outlet piping creating an outlet chamber proximal to the outlet;

(b) a disk member closable on the inlet valve seat;

(c) an adjustment screw acting on a spring in the body biasing the disk member to rest on the inlet valve seat with a set force such that when the pressure in the pressure vessel exceeds the set pressure resulting from the set force, the disk member is lifted from the inlet valve seat; and (d) a secondary orifice between the valve body chamber and the outlet, the secondary orifice being sized so that pressure in the valve body chamber is less than about 50% of the pressure in the inlet chamber and so that pressure in the outlet chamber is less than about 50% of the pressure in the valve body chamber, when the valve opens due to a pressure in the pressure vessel or flow line exceeding the set pressure during testing under the specified operating conditions.

16. The combination of claim 15 wherein the adjustment screw acts indirectly on the spring.

17. The combination of claim 15 wherein the adjustment screw comprises a hollow portion.

18. The combination of claim 15 wherein the blow-down value is less than 15%.

19. The combination of claim 15 further comprising less than about 20 feet of outlet piping attached to the outlet.

20. An improved low blow-down snap-type safety relief valve having an inlet, a disk member closable on the inlet, a mechanism biasing the disk member on the inlet, a body, and an outlet, the valve preventing built-up downstream back pressures from changing a blow down value, the improvement comprising a secondary orifice in the body of the safety relief valve sized to permit gas to escape from the body through the secondary orifice in a sonic flow when the valve is opened during testing under operating conditions specified for the use of the valve.

21. A method of designing a low blow-down snap-type safety relief valve to have sonic flow out of a secondary orifice into outlet piping, the method comprising:

(a) choosing a set of operating conditions under which the valve will ordinarily be run, including a set pressure;

(b) providing a trial snap-type safety relief valve having:
  (i) a body attachable to the pressure vessel, the body comprising a chamber and an inlet and an outlet, the inlet comprising an inlet valve seat, the outlet being adapted to attach to the outlet piping;
  (ii) a disk member closable on the inlet valve seat;
  (iii) a mechanism in the body biasing the disk member to rest on the inlet valve seat with a set force such that when the pressure in the pressure vessel exceeds the set pressure resulting from the set force, the disk member is lifted from the inlet valve seat; and
  (iv) a secondary orifice between the chamber and the outlet, the secondary orifice having a first diameter; and
  (v) the snap-type safety relief valve having a first pressure gauge attached thereto, the snap-type safety relief valve being mounted on a pressure vessel, the pressure vessel having a second pressure gauge attached thereto;

(c) causing the snap-type safety relief valve to snap open by increasing the pressure in the pressure vessel to exceed the set pressure; and (d) comparing a reading from the first pressure gauge to a reading from the second pressure gauge while the valve is open,
  (i) if the reading of the pressure of the first pressure gauge is from about 35% to about 50% of the pressure of the second pressure gauge, then the design process is complete; else
  (ii) if the reading of the pressure of the first pressure gauge is not from about 35% to about 50%, adjusting the diameter of the secondary orifice and repeating steps (c)–(d) until the reading of the first pressure gauge is from about 35% to about 50% of the reading of the second pressure gauge.

22. The method of claim 21 wherein in step (d) the reading of the first pressure gauge is less than about 35% of the reading of the second pressure gauge.

23. The method of claim 22 wherein in step (d)(ii) the diameter of the secondary orifice is reduced.

24. The method of claim 21 wherein in step (d) the reading of the first pressure gauge is greater than about 50% of the reading of the second pressure gauge.

25. The method of claim 24 wherein in step (d)(ii) the diameter of the secondary orifice is enlarged.

26. A method of relieving pressure from a pressurized system wherein a snap-type safety relief valve is connected in fluid communication with the pressurized system and the valve has (i) a body surrounding a chamber, (ii) an inlet with an inlet valve seat, (iii) a disk member closeable on the inlet valve seat, (iv) a mechanism biasing the disk member closed on the inlet valve seat, (v) an outlet attachable to outlet piping, and (vi) a secondary orifice between the chamber and the outlet, the method comprising:

(a) exceeding a set pressure established for the valve, thereby lifting the disk member from the inlet valve seat;

(b) flowing gas from pressurized system through the inlet into the chamber in a sonic flow; and (c) flowing gas from the chamber through the secondary orifice into the outlet in a sonic flow.

* * * * *